US008521616B2

(12) United States Patent
End et al.

(10) Patent No.: US 8,521,616 B2
(45) Date of Patent: Aug. 27, 2013

(54) METHOD AND SYSTEM FOR PROVIDING FITTING AND SIZING RECOMMENDATIONS

(75) Inventors: Nicholas B. End, Pittsburgh, PA (US); Grant B. Fresen, Pittsburgh, PA (US); Matthew Tyler Wilkinson, Pittsburgh, PA (US)

(73) Assignee: Shoefitr, Inc., Pittsburgh, PA (US)

( * ) Notice: Subject to any disclaimer, the term of this patent is extended or adjusted under 35 U.S.C. 154(b) by 541 days.

(21) Appl. No.: 12/800,549

(22) Filed: May 18, 2010

(65) Prior Publication Data
US 2010/0293076 A1 Nov. 18, 2010

Related U.S. Application Data

(60) Provisional application No. 61/216,310, filed on May 18, 2009.

(51) Int. Cl.
*G06Q 30/00* (2012.01)

(52) U.S. Cl.
USPC .... 705/27.2; 705/26.7; 705/26.63; 705/26.64

(58) Field of Classification Search
USPC .................................................. 705/26–27.2
See application file for complete search history.

(56) References Cited

U.S. PATENT DOCUMENTS

| | | | |
|---|---|---|---|
| 5,515,268 A | 5/1996 | Yoda | |
| 6,741,728 B1 | 5/2004 | Genest | |
| 6,879,945 B1 * | 4/2005 | Cook | 703/2 |
| 2002/0023087 A1 * | 2/2002 | Vickery et al. | 707/7 |
| 2003/0069807 A1 * | 4/2003 | Lyden | 705/26 |
| 2007/0011173 A1 | 1/2007 | Agostino | |
| 2009/0210320 A1 | 8/2009 | Adelman et al. | |
| 2009/0287452 A1 * | 11/2009 | Stanley et al. | 702/155 |

OTHER PUBLICATIONS

Benjamin Sutherland, "Making Sure the Shoe Fits," Newsweek International, Feb. 20, 2006; 1 p.*

* cited by examiner

*Primary Examiner* — Adam Levine
(74) *Attorney, Agent, or Firm* — Fox Rothschild LLP

(57) ABSTRACT

A method and system for displaying footwear information. The method and system utilize a database on a computer readable medium, the database including a plurality of footwear representations including various measurement parameters. A user inputs a selection of a reference footwear model. A footwear representation of the reference footwear model is loaded from the database along with footwear representations for a plurality of additional models of footwear. The footwear representation for the reference footwear model and the footwear representations for the additional models of footwear are compared to identify at least one of the additional models of footwear having similar measurement parameters as the reference footwear model. Additional models identified are presented to the user as a recommendation.

18 Claims, 8 Drawing Sheets
(5 of 8 Drawing Sheet(s) Filed in Color)

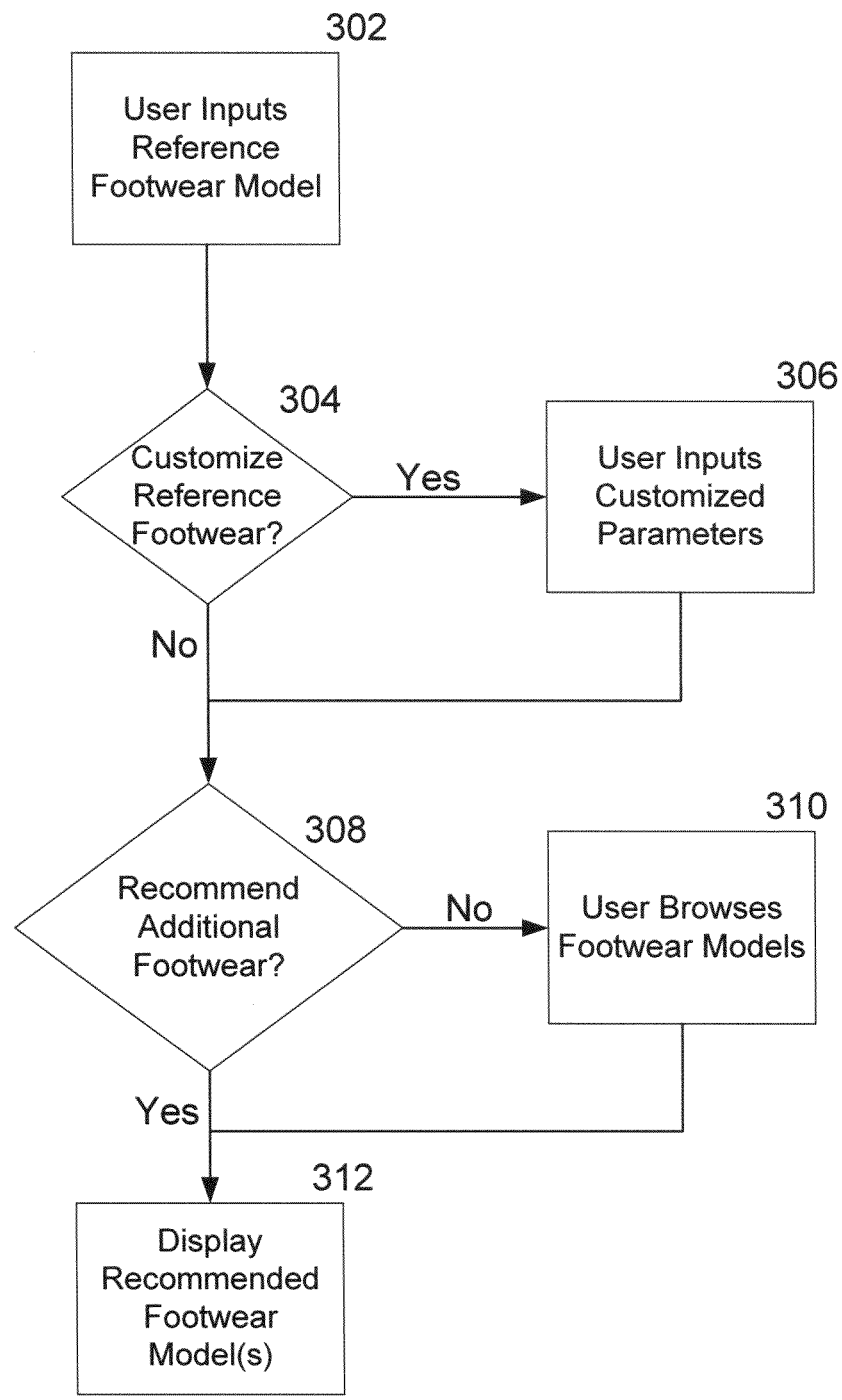

# METHOD AND SYSTEM FOR PROVIDING FITTING AND SIZING RECOMMENDATIONS

CROSS-REFERENCE TO RELATED APPLICATION

This application claims the priority benefit of U.S. Provisional Application No. 61/216,310 entitled "Method and Application for Providing Comparative Footwear Fitting and Sizing Recommendation" filed May 18, 2009, the content of which is hereby incorporated by reference in its entirety.

BACKGROUND

The present disclosure relates to providing a user apparel information based upon the user's selection of another piece of apparel. More specifically, the present disclosure relates to providing a user information related to a footwear model based upon the user's selection of a different model of footwear.

Finding the correct apparel size to purchase online is difficult due to the inability to try on the apparel. A user must select a size the user thinks will fit and try the apparel on once the apparel is delivered to the user. However, sizes may vary among various manufacturers, which may cause a user to select an incorrect size. Situations like this lead to a high number of apparel returns. Many people choose not to purchase apparel online at all due to the risk of not being satisfied with a purchase and having to return the item, which often results in additional out of pocket expenses for the user or seller.

One example of size varying greatly among manufacturers is in footwear. Many choose not to shop for footwear online because they cannot physically try on the footwear and do not want the inconvenience of returning improperly fitting footwear. Furthermore, those who do shop online typically purchase the same footwear and size of which they are familiar, thus limiting the selection potential.

Finding the ideal fit for footwear is also problematic because of the lack of uniformity and consistency of sizing among footwear manufacturers. For example, a size 10 shoe or boot from one footwear manufacturer typically has different internal dimensions from a size 10 shoe or boot from another footwear manufacturer. Internal dimensions may even differ between models offered by a single manufacturer. Manufacturers continually change and discontinue models, so there is typically a need for fitting even if the user has found a good fit in a given shoe model.

To alleviate problems caused by size discrepancies among manufacturers, some retailers maintain a list (e.g., in a database) of various dimensions for various models of footwear, thereby allowing a customer to compare one model to another. As taught in U.S. Pat. No. 6,741,728 to Leonard J. Genest, the contents of which are hereby incorporated by reference, footwear image data is collected from manufacturers' footwear lists. Populating the database is therefore dependent on manufacturers' agreements to share their footwear design information, as well as the accuracy of that information.

United States Patent Application Publication No. 2007/0011173 to Val Agostino (U.S. Ser. No. 11/419,967, now abandoned), the contents of which are hereby incorporated by reference, compares a populated footwear database to a user footwear profile by using foot measurements to suggest a recommended fit. In the case of U.S. Pat. No. 6,741,728 and U.S. Pub. No. 2007/0011173, foot measurements are used to find the best footwear fit and recommended sizing. There are many variables that go into measuring user's feet that make for a difficult fitting process even when the real measurements are known. These factors include the type and thickness of sock being worn, the time of day and season in which the user's feet are measured, fluctuation in body weight, and the activity in which they use the footwear.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a method of displaying footwear information. The method includes maintaining a database on a computer readable medium, the database including a plurality of footwear representations wherein each footwear representation comprises data for at least the following data fields: full length, tapering, effective length, and at least one of width measurement. The method also includes receiving, at a processing device in communication with the computer readable medium, a user selection of a reference footwear model; retrieving, by the processing device, a footwear representation of the reference footwear model from the database; retrieving, by the processing device, footwear representations for a plurality of additional models of footwear from the database; comparing, by the processing device, the footwear representation for the reference footwear model and the footwear representations for the additional models of footwear to identify at least one of the additional models of footwear having full length, tapering, effective length and a plurality of width measurements that are within an acceptable range of the reference footwear model; and displaying, on a display device operably connected to the processing device, the footwear model of the identified one of the additional models of footwear to the user as a recommendation.

In another general respect, the embodiments disclose a system for displaying footwear information. The system includes a processing device; and a computer readable medium in communication with the processing device. The computer readable medium includes a database including a plurality of footwear representations wherein each footwear representation comprises data for at least the following data fields: full length, tapering, effective length, and at least one of width measurement. The computer readable medium also includes one or more programming instructions for receiving, at the processing device, a user selection of a reference footwear model; retrieving, by the processing device, a footwear representation of the reference footwear model from the database; retrieving, by the processing device, footwear representations for a plurality of additional models of footwear from the database; comparing, by the processing device, the footwear representation for the reference footwear model and the footwear representations for the additional models of footwear to identify at least one of the additional models of footwear having full length, tapering, effective length and a plurality of width measurements that are within an acceptable range of the reference footwear model; and displaying, on a display device operably connected to the processing device, the footwear model of the identified one of the additional models of footwear to the user as a recommendation.

In another general respect, the embodiments disclose a method of displaying apparel information. The method includes maintaining a database on a computer readable medium, the database including a plurality of apparel representations wherein each apparel representation comprises data for a plurality of measurement parameters; receiving, at a processing device in communication with the computer readable medium, a user selection of a reference apparel model; retrieving, by the processing device, an apparel representation of the reference apparel model from the database; retrieving, by the processing device, apparel representations for a plurality of additional models of apparel from the database; comparing, by the processing device, the apparel representation for the reference apparel model and the apparel representations for the additional models of apparel to identify at least one of the additional models of apparel having measurement parameters that are within an acceptable range of the reference apparel model; and displaying, on a display device operably connected to the processing device, the apparel model of the identified one of the additional models of apparel to the user as a recommendation.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates an exemplary footwear recommendation process according to an embodiment;

DETAILED DESCRIPTION

For purposes of the discussion below, "footwear" refers to any type of apparel that may be worn on a persons lower body, specifically the feet and optionally also the lower legs. Examples include athletic shoes, work boots, ski boots, sandals, slippers, and any other apparel item designed to be worn on the foot and optionally also the lower leg.

"Footwear model" refers to a specific type of footwear offered by a manufacturer, typically having a name, model and item number.

"Footwear representation" refers to a computer-readable representation of a footwear model stored in a computer readable medium. A footwear representation may be a two dimensional or three dimensional representation.

As discussed above, various problems exist in attempting to match a user to a specific model of apparel based upon user measurements and manufacturers' data. The present disclosure does not require a foot measurement. Inputting user foot measurements, whether it be via 3D imaging or a measuring device, may be inconvenient to the user especially when shopping online. Rather, the present disclosure utilizes the footwear size and model of a user's current footwear to determine recommendations for alternative footwear models. Users are familiar with their footwear. They have tried it on and worn the footwear for an extended period of time, at different times in the day, with different socks, and for different activities. The present disclosure enables the user to customize the fit of new footwear by taking the input of footwear they have already worn, translating fit into an internal measurement profile and comparing those measurements to a database of internal footwear measurements of various models and sizes in order to recommend a footwear model and size for the user.

Figure 1:
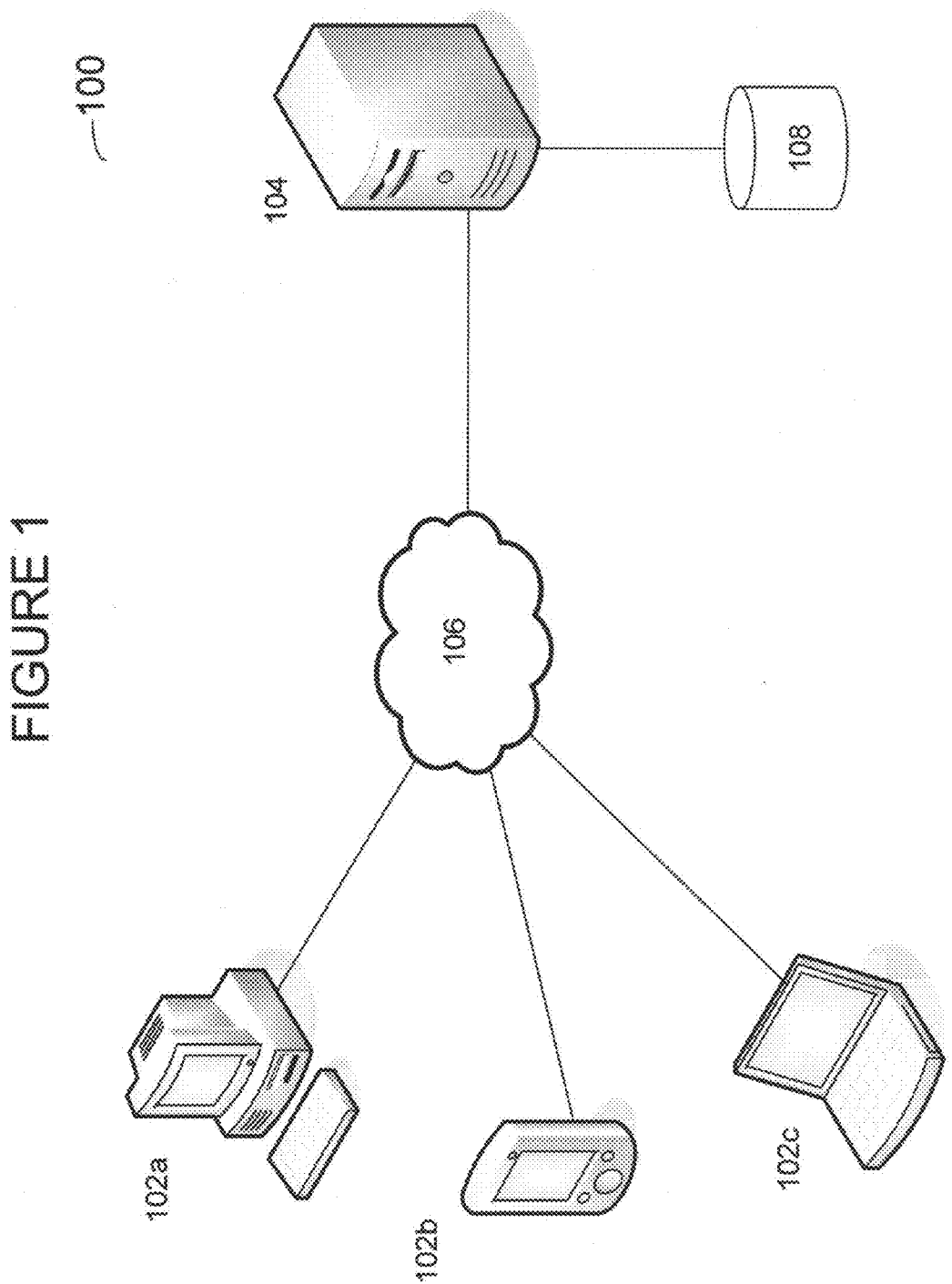
FIG. 1 illustrates an exemplary computer network according to an embodiment.

FIG. 1 illustrates an exemplary communications network 100 according to an embodiment of the invention. The network 100 may include various user computing devices such as desktop computer 102a, portable device 102b (including, but not limited to cellular telephones, smart phones, personal digital assistants, or other portable devices capable of establishing a communications link), and laptop or notebook computer 102c. The computing devices 102a, 102b, 102c may be accessed by the user in various locations such as at home, at a store, at work, at an airport, or any other similar location. A user may access a browser or similar user interface at one of the computing devices 102a, 102b, 102c to connect to a server 104 via a communications network 106. The server 104 may include a computer readable memory device containing instructions for performing a process of recommending to the user a footwear model based upon the user's current footwear model. Exemplary steps of this process are discussed in more detail in the description of FIG. 3 below.

The server 104 is also operably attached to a database 108. The database 108 includes various data related to footwear models. For example, the database 108 may include various data fields such as footwear brand, manufacturer, model, size, length, tapering, effective length, various width measurements, and any other related data. The server 104 accesses the database 108 to provide footwear related information to the user at one of the computing devices 102a, 102b, 102c.

Figure 2A:
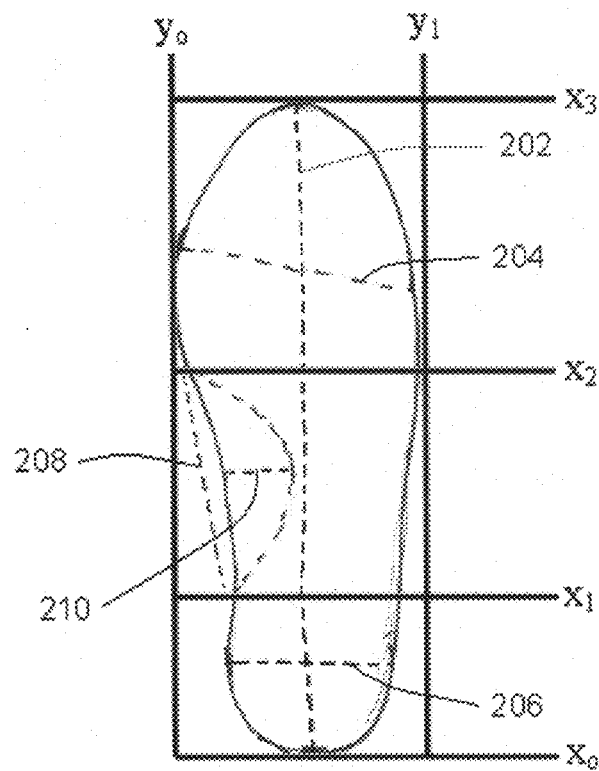
FIG. 2a illustrates an exemplary bottom view of a footwear model and various internal measurements of the footwear model according to an embodiment.
Figure 2B:
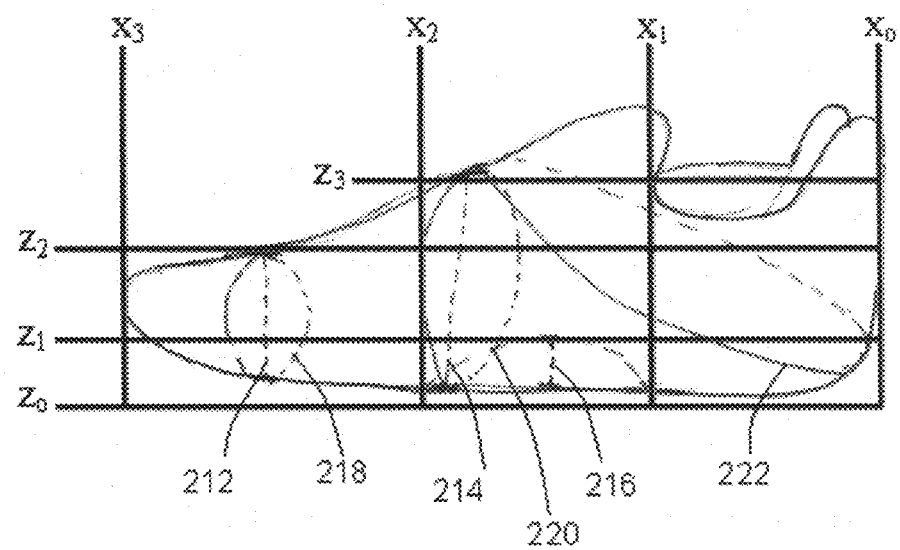
FIG. 2b illustrates an exemplary side view of a footwear model and various internal measurements of the footwear model according to an embodiment.

FIGS. 2a and 2b illustrate a set of internal measurements that may be obtained for each footwear model and imported into the database 108 such that a two or three dimensional (3D) representation of the footwear may be constructed. A 3D scanner may be used to acquire the internal measurements of a footwear model. This provides more accurate information for storage in the database than merely relying on manufacturer supplied data as is done in the prior art. Suitable scanners may include a laser scanner, a structured light or "white light" scanner, a touch probe, a magnetic resonance imaging (MRI) scanner, a stereoscope, a computed tomography (CT or CAT) scanner, or other similar 3D scanners. Based upon the internal measurement data, measurement parameters may be extracted to create a reference plane. As shown in FIG. 2a, an X-Y reference plane may be placed over the scan. Similarly, in FIG. 2b, an X-Z reference plane may be placed over the scan. When combined, the two reference planes form a single 3D X, Y, Z coordinate set.

Various measurement parameters may be extracted from the scanned views based upon the reference planes. For example, a total length measurement 202 may be determined by subtracting a value for line $X_0$ (indicating heel position) from a value for line $X_3$ (indicating toe position). Similarly, total width 204 may be determined by subtracting a value for line $Y_o$ (indicating an outermost edge) from a value for line $Y_1$ (indicating an innermost edge). Additional measurement parameters may be determined such as heel width 206, arch length 208 (as defined by the value of line $X_2$ minus the value of line $X_1$), and arch width 210. Additional measurement parameters may be determined from the profile view such as toe box height 212, forefoot height 214 (as defined by the value of line $Z_3$ minus the value of line $Z_0$), and arch height 216 (as defined by the value of line $Z_1$ minus the value of line $Z_0$). Three dimensional measurements may be determined as well such as toe box girth 218 (e.g., the inner diameter of the toe box area as determined based upon the toe box height 212 and the total width 204), forefoot girth 220 (e.g., the inner diameter of the forefoot area), and heel to toe girth 222. Additional measurement parameters may be determined from the recorded measurements such as the footwear's tapering or change in width as a percentage of total length. Additionally, effective length may be determined which is the interior length of the footwear model based upon any slope of a heel cushion in the footwear model. It should be noted that this list of measurement parameters is provided by way of example only, and additional measurement parameters may be included such as heel height, arch height, girth, foot opening diameter, and any other relevant information.

Additional measurement parameters may be associated with a footwear model depending on model type. For example, a running shoe may have measurement parameters associated with stability, cushioning, motion control, racing spikes, and any other relevant measurement parameters. Depending on the information available from scanning the footwear model, in addition to any information available from the manufacturer, some additional measurement parameters may be assigned a numerical value representing the measurement parameter. For example, an expensive running shoe may have a high level of cushioning. The measurement parameter for cushioning may be set to "high" or a similar numerical value representing a high level of cushioning in the database (e.g., database 108). Alternatively, an additional measurement parameter may be assigned merely a yes/no value, indicating whether the footwear model has this additional measurement parameter. For example, a running shoe having racing spikes may only list "yes" as the value for the racing spikes measurement parameter in the database (e.g., database 108).

Each measurement parameter may be weighted based on fitting significance. For example, total length and width measurements may have a higher weight assigned than forefoot height, arch width, arch height, girth, or various other measurement parameters. A fitting algorithm may determine the weightings based on several criteria related to the footwear model. Exemplary criteria may include intended purpose (e.g., running, playing tennis, playing golf, skiing, etc.), material used to manufacture the footwear model, weight of the footwear model, and any other appropriate criteria. After the measurement parameters are determined and weighted, the information is stored in the database 108 until the information is loaded by the server 104 to construct a 3D representation of the footwear for displaying to a user.

FIG. 3 illustrates an exemplary process of displaying recommendations of footwear models to a user. A user may access a set of computer program instructions stored on a central computing device (e.g., the server 104) via a remote computing device (e.g., computing devices 102a, 102b, 102c). The remote computing device may display a user interface through which the user may input 302 a reference footwear model as well as various information related to the reference footwear model such as size and width. Various input devices may be provided such as text fields, drop down menus, or other input devices to aid in the user during input 302. The reference footwear model should be of a similar type to a footwear model the user desires to learn more about or purchase, but it is not necessary. For example, if a user is looking for a running shoe; the user may input 302 their current running shoe as a reference model. However, if the user is purchasing a new type of shoe (e.g., a ski boot) that they do not own a close reference model to, any type of footwear may be input as a reference model. Additionally, if the user is unsure of the model of their reference footwear, the user may manually input measurement information.

Once the user has input 302 the reference footwear model, the user is given the option 304 to customize the measurement parameters of the reference footwear model. If the user opts to alter the measurement parameters, a set of measurement customization tools are displayed to the user via the user interface, and the user is given a chance to input 306 customized parameters. For example, the user may indicate that the toe box of the reference footwear model is too loose, too tight, or fits fine, thereby defining various comfort ratings for each region of the reference footwear model.

Figure 4A:
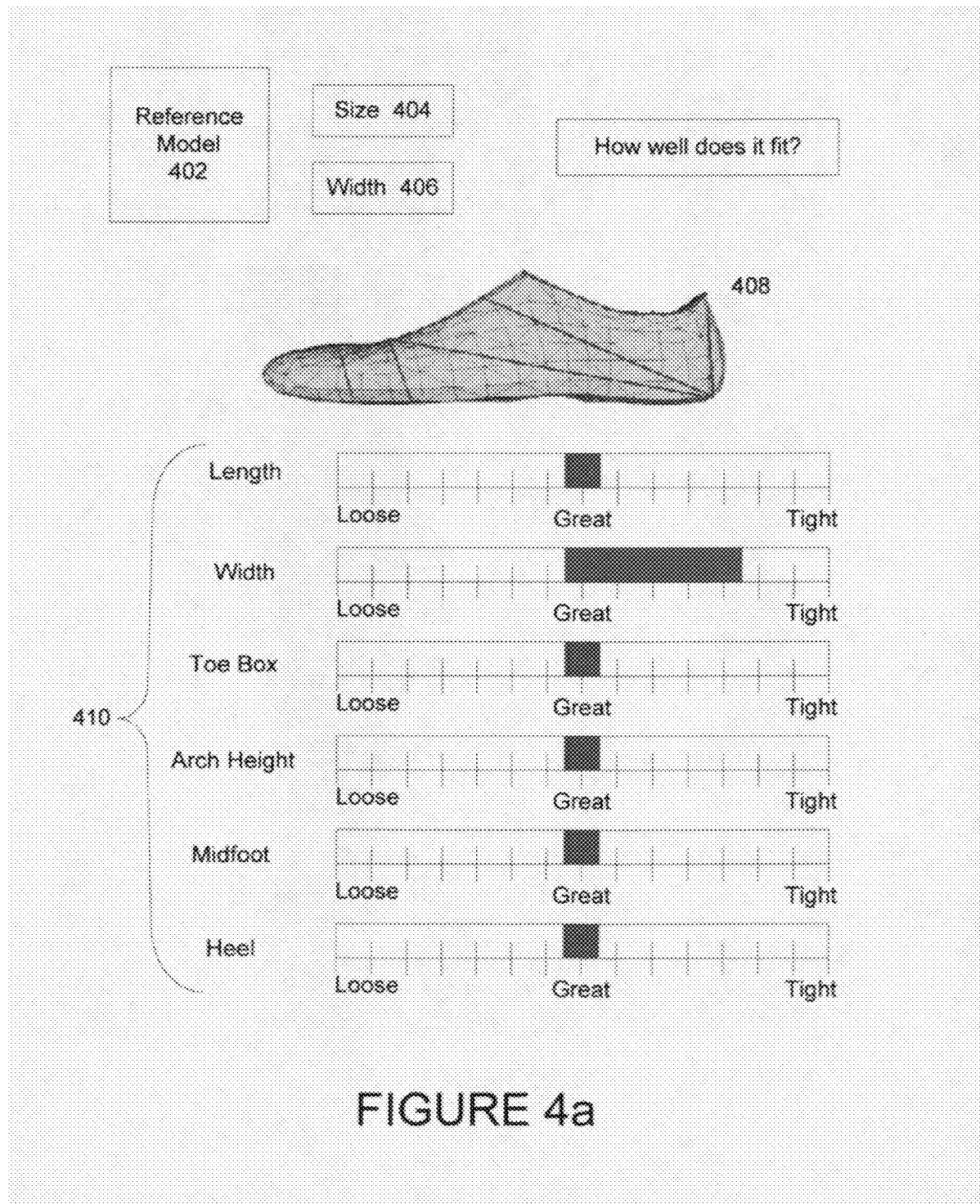
FIG. 4a illustrates an exemplary user interface for providing information related to a user's footwear model according to an embodiment.

FIG. 4a illustrates an exemplary screenshot of an exemplary user interface as the user inputs 306 any customized parameters. The user interface displays various data fields such as the user input footwear model 402, the user selected size 404, the user selected width 406, and a 3D representation 408 of the footwear as loaded from the database. Additionally, various inputs 410 are provided to allow the user to customize various aspects of the reference footwear model, thereby defining customized user comfort ratings. In this exemplary screenshot, the user is given the option to adjust the comfort rating for length, width, toe box, arch height, midfoot and heel. Changing the comfort ratings may alter the 3D representation 408 accordingly. For example, the color of any area changed in the inputs 410 may be altered in the 3D representation 408 to show areas having tight fit in red, areas having loose fit in blue, and area having correct fit in green. Other colors of fit gradings may be used. These changes in comfort ratings may be used to determine an alternative set of measurement parameters to be used when determining additional footwear models to recommend to the user.

After inputting 306 customized parameters, or if the user opts not to enter any customized parameters, the user may be prompted 308 to receive any recommended footwear models based upon their input. The user may decline to view the recommended footwear and instead browse 310 additional footwear models. During browsing 310, the user may view various footwear models from multiple manufacturers. Upon selection of a particular model, or if the user opts to view the recommended footwear when prompted 308, one or more recommended footwear models is displayed 312.

To display 312 the recommended footwear models, a determination may be made as to which footwear models are similar to the reference footwear model. This recommendation may be determined based upon several characteristics of the reference footwear model such as manufacturer, type (e.g., running shoe, tennis shoe, ski boot, etc.), price level, and any other characteristics that may be used to compare footwear models. After loading the representation for the reference footwear model from the database, the software may load additional footwear representations from the database based upon the initial recommendation determination. The additional footwear representations are compared to the reference footwear representation, comparing the various measurement parameters, to determine an appropriate size in the reference footwear models that is comparable to the reference footwear model's size. Based upon the comparison, one or more of the additional footwear models may be identified as similar to the reference footwear model, as well as having a similar size to the reference footwear model, and be displayed to the user as a recommendation. For example, if a user inputs a reference model running shoe with a length of 12 inches, a width of 4.5 inches, a toe box height of 1.5 inches, and various other parameters, an additional footwear model of a running shoe with similar measurements, or measurements within an acceptable range (e.g., within plus or minus 5%) may be selected and displayed as a recommended alternative to the reference footwear model.

If the user input customized parameters by altering the comfort ratings, the measurement parameters of the reference footwear model may be altered to reflect the changes. For example, if the user selected that the 12 inch length of the reference model was a bit too tight, the value for the length of the reference footwear model may be adjusted to 12.5. This may result in the recommended footwear model complying with the user's actual needs rather than merely providing a model with similar measurement parameters to the user's current reference footwear model, thus providing the user with a means to completely customize their desired footwear feel and fit.

Figure 4B:
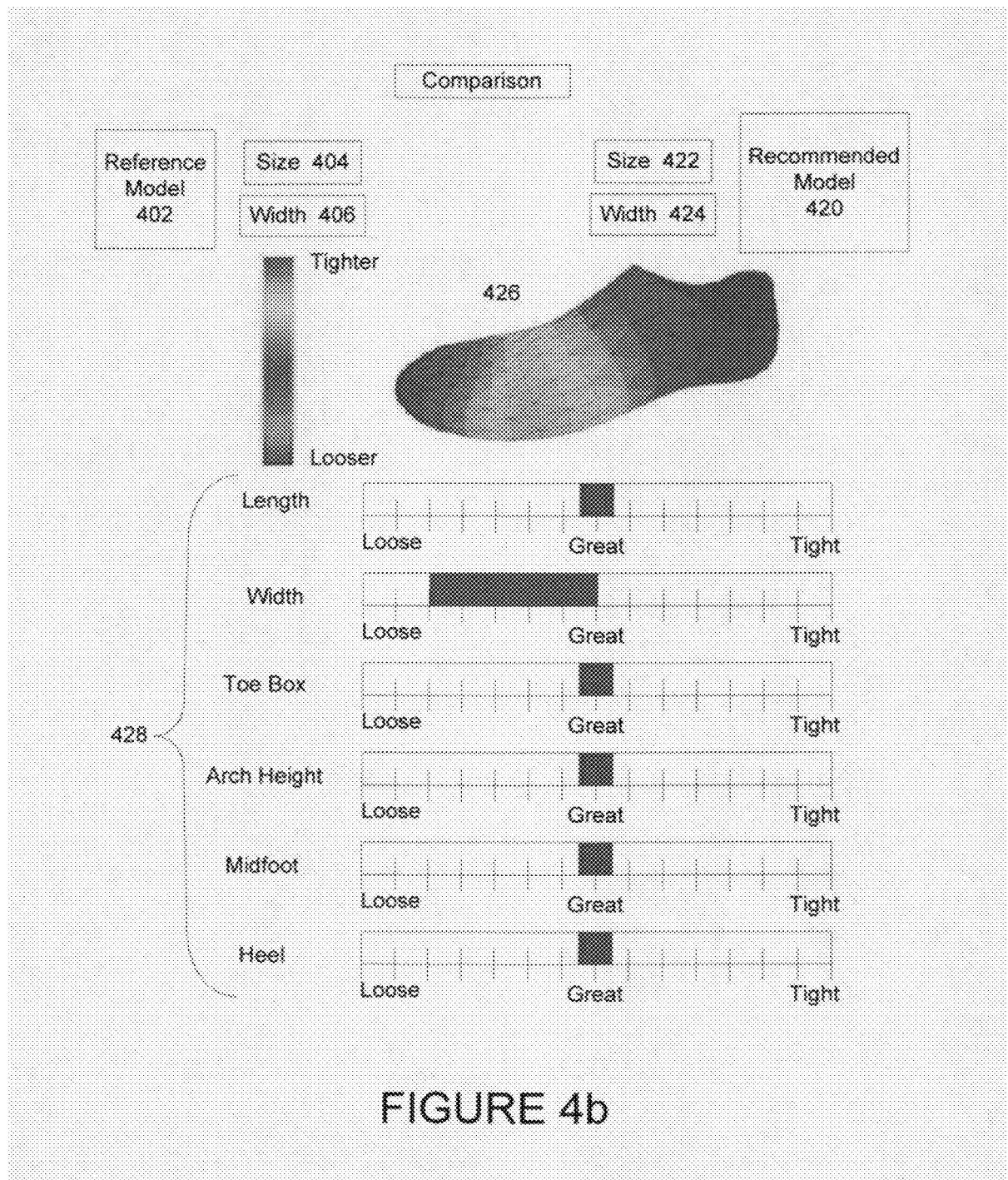
FIG. 4b illustrates an exemplary user interface for displaying related footwear information to a user according to an embodiment.

FIG. 4b illustrates an exemplary screenshot of the user interface displaying 312 a recommendation to the user of a similar footwear model. The user interface displays various data fields such as the user input footwear model 402, the user selected size 404, the user selected width 406, recommended output footwear 420, size of the recommended footwear model 422, width of the recommended footwear model 424, and a 3D comparison representation 426 highlighting various differences in sizing between the reference footwear model and the recommended footwear model. Additionally, various ranges 428 may be provided showing the differences in fitting between the reference footwear model and the recommended footwear model. Similar to before, areas where the recommended footwear model are tighter than the reference footwear model may be shown in red, areas where the recommended footwear model are looser than the reference footwear model may be shown in blue, and areas where the recommended footwear model and the reference footwear model have the same fit may be shown in green. Based upon this comparison, the user can quickly determine how the recommended footwear model would fit as compared to the reference model. The user may then be prompted to purchase the recommended footwear model, save the recommended information in a user profile, or the user can simply copy the recommended information for purchase at a later time.

Figure 4C:
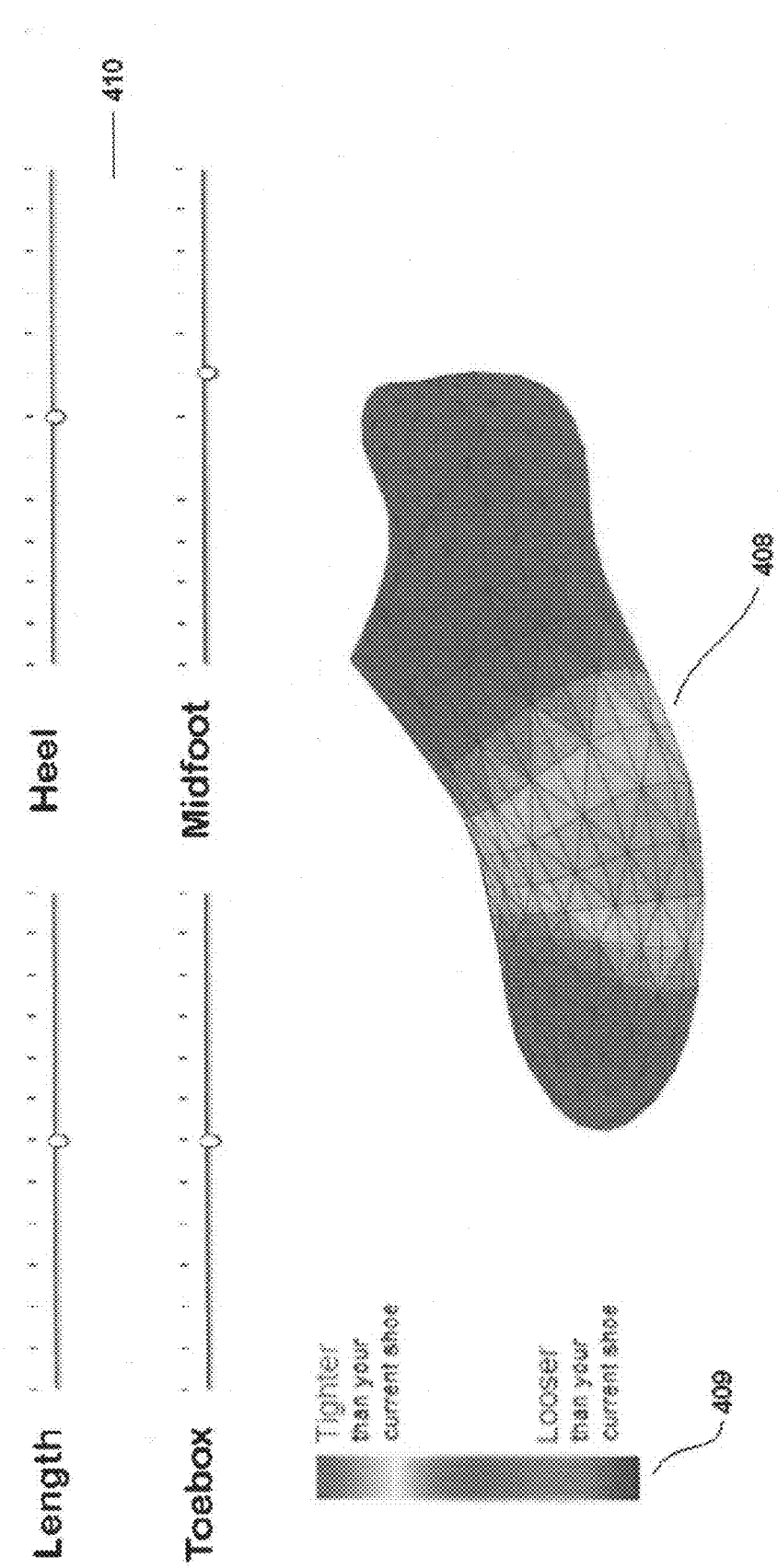
FIG. 4c illustrates an alternative exemplary user interface for providing information related to a user's footwear model according to an embodiment.

FIG. 4c illustrates an additional exemplary screenshot of a user interface as the user inputs 306 any customized parameters. Like the user interface illustrated in FIG. 4a, the user interface of FIG. 4c displays a 3D representation 408 of the reference footwear as loaded from the database. Additionally, various inputs 410 are provided to allow the user to customize various aspects of the reference footwear model, thereby defining customized user comfort ratings. In this exemplary screenshot, the user is given the option to adjust the comfort rating for length, toe box, midfoot and heel. Changing the comfort ratings may alter the 3D representation 408 accordingly. For example, the color of any area changed in the inputs 410 may be altered in the 3D representation 408 to show areas having tight fit in red, areas having loose fit in blue, and area having correct fit in green. Other color schemes (e.g., grayscale), or additional colors for additional layers of gradation, may be used. A color grading scale 409 may be provided showing the user how changing the inputs 410 affects the 3D representation 408.

Figure 4D:
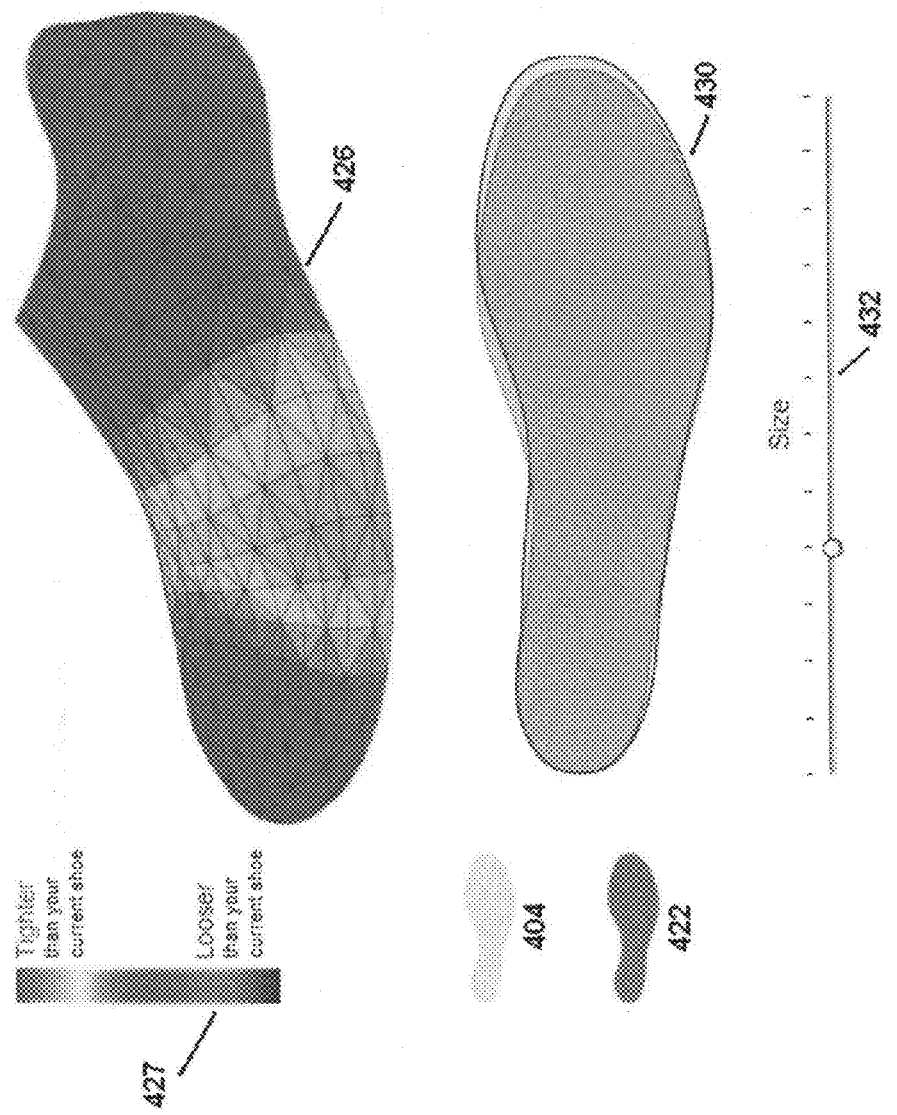
FIG. 4d illustrates an alternative exemplary user interface for displaying related footwear information to a user according to an embodiment.

FIG. 4d illustrates an additional exemplary screenshot of the user interface displaying 312 a recommendation to the user of a similar footwear model. Like the user interface illustrated in FIG. 4b, the user interface of FIG. 4d displays various data fields such as the user selected size 404, size of the recommended footwear model 422, and a 3D comparison representation 426 highlighting various differences in sizing between the reference footwear model and the recommended footwear model. A color grading scale 427 may be provided showing the user size or fitting differences between the reference footwear model and the selected recommended footwear model. Similar to before, areas where the recommended footwear model are tighter than the reference footwear model may be shown in red, areas where the recommended footwear model are looser than the reference footwear model may be shown in blue, and areas where the recommended footwear model and the reference footwear model have the same fit may be shown in green. Based upon this comparison, the user can quickly determine how the recommended footwear model would fit as compared to the reference model.

Additionally, a 2D comparison representation 430 may be displayed showing the size of the reference footwear model as compared to the recommended footwear model. An input 432 may also be displayed, providing the user with a means to alter the size of the recommended footwear model. If the user alters the size of the recommended footwear model via the input 432, any resulting changes may be reflected in updates to the 3D comparison representation 426 as well as the 2D comparison representation 430.

Figure 5:
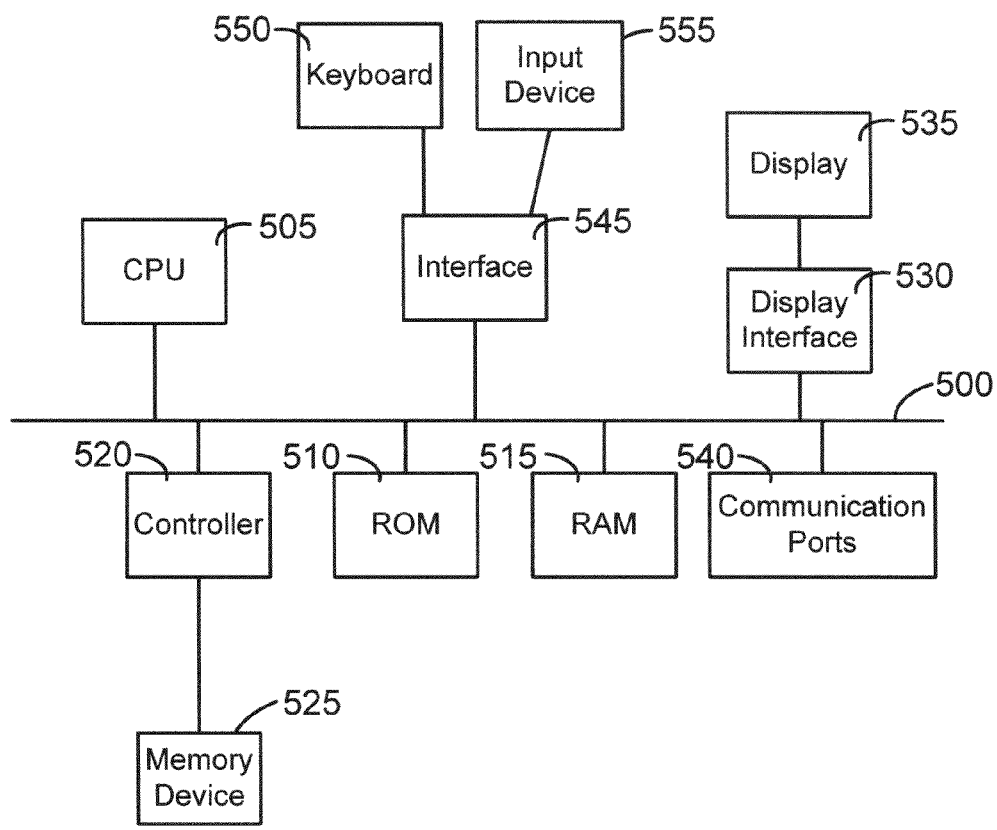
FIG. 5 illustrates various embodiments of a computing device for implementing various methods and processes described herein.

FIG. 5 depicts a block diagram of exemplary internal hardware that may be used to contain or implement program instructions such as the software programming instructions discussed above in reference to FIGS. 1 and 2. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices. Additionally, the memory devices 525 may be configured to include individual files for storing any feedback information, common files for storing groups of feedback information, or one or more databases for storing the feedback information.

Program instructions, software or interactive modules for providing the digital marketplace and performing analysis on any received feedback may be stored in the ROM 510 and/or the RAM 515. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

The above system and process may be made available to users as a standalone product, or integrated directly into a retailer's website. For example, when browsing, a user may select a footwear model. When viewing the model, there may be an input field, such as a button or link, that prompts the user to determine their recommended size in the selected footwear model. Upon selecting the input field, the user may be prompted to enter in a reference footwear model, size, width, and any comfort ratings as discussed above. Based upon this information, the retailer web site may load a 3D representation for the reference footwear model, compare the reference footwear model against a 3D representation for the selected footwear model, and based on this comparison, provide the user accurate sizing information for the selected footwear model. For example, if the user enters a specific model, size 12 and standard width, the retailer's website may return a recommendation the user purchase size 12.5, standard width in the selected footwear model.

It should be noted that the above system and process is directed to footwear only as an example. Additional apparel may be used such as shirts, pants, hats, outerwear, etc. Similar measurements may be obtained for each item of apparel, stored in a database, and compared as requested by a user to determine a recommended apparel item in response to a user input. For example, an online retailer may incorporate the above system and process to determining sizing and recommendations for a user searching for a pair of pants. The user may enter a pair of pants they currently wear as a reference pair of pants. Various measurement parameters for the reference pair of pants may be loaded from a database. The measurement parameters may include waist diameter, length, inseam, calf diameter, thigh diameter, fastener type, number of pockets, and any additional measurement parameters related to the reference pair of pants. These measurement parameters may be used to determine sizing information for the user, or to recommend additional pairs of pants the user may want to consider purchasing.

Similarly, a user searching for a new hat may input a reference hat they currently wear having various measurement parameters such as inner diameter, height, various curvature measurements, logo, adjustable fitting sizes, and additional measurement parameters. A user searching for a shirt may input a reference shirt they currently wear having various measurement parameters such as size, length, waist diameter, chest diameter, shoulder diameter, neck opening size, sleeve length, and additional related measurement parameters.

It should be noted that while pants, hats and shirts are discussed above in greater detail, the system and process discussed herein may be expanded and applied to any type of apparel having one or more measurement parameters.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of displaying footwear information comprising:
    maintaining a database on a computer readable medium, the database including a plurality of footwear representations wherein each footwear representation comprises data for at least the following plurality of data fields:
        full length,
        tapering,
        effective length, and
        at least one width measurement;
    receiving, at a processing device in communication with the computer readable medium, a user selection of a reference footwear model;
    retrieving, by the processing device, a footwear representation of the reference footwear model from the database;
    retrieving, by the processing device, footwear representations for a plurality of additional models of footwear from the database;
    comparing, by the processing device, the footwear representation for the reference footwear model and the footwear representations for the additional models of footwear to identify at least one of the additional models of footwear having full length, tapering, effective length and at least one width measurement that are within an acceptable range of the reference footwear model; and
    displaying, on a display device operably connected to the processing device, the footwear model of the identified one of the additional models of footwear to the user as a recommendation, wherein the footwear model of the identified at least one of the additional models of footwear comprises a visual representation of the identified at least one of the additional models of footwear showing a fit comparison between the reference footwear model and the identified at least one of the additional models of footwear, wherein the fit comparison comprises:
        highlighted areas where the reference footwear model is tighter than the identified at least one of the additional models of footwear,
        highlighted areas where the reference footwear model is looser than the identified at least one of the additional models of footwear, and
        highlighted areas where the reference footwear model and the identified at least one of the additional models of footwear have the same fit.

2. The method of claim 1, further comprising:
    receiving, at the processing device, a user input indicating a comfort rating for at least one of the plurality of data fields;
    in response to the user input, displaying an altered footwear representation for the reference footwear model indicating comfort ratings for each of the plurality of data fields.

3. The method of claim 2, wherein the altered footwear representation comprises color coded regions indicating the comfort ratings.

4. The method of claim 2, wherein the comparing the footwear representations further comprises evaluating the comfort ratings for each of the plurality of data fields to determine the acceptable range for each of the plurality of data fields.

5. The method of claim 1, wherein the tapering is a full width measurement as a percentage of full length of a footwear model being measured.

6. The method of claim 1, wherein the effective length is an altered full length based upon any slope of a heel cushion in a footwear model being measured.

7. The method of claim 1, wherein each footwear representation is a three dimensional representation.

8. A system for displaying footwear information comprising:
   a processing device; and
   a computer readable medium in communication with the processing device, the computer readable medium comprising:
      a database including a plurality of footwear representations wherein each footwear representation comprises data for at least the following plurality of data fields:
         full length,
         tapering,
         effective length, and
         at least one width measurement; and
      one or more programming instructions for:
         receiving, at the processing device, a user selection of a reference footwear model,
         retrieving, by the processing device, a footwear representation of the reference footwear model from the database,
         retrieving, by the processing device, footwear representations for a plurality of additional models of footwear from the database,
         comparing, by the processing device, the footwear representation for the reference footwear model and the footwear representations for the additional models of footwear to identify at least one of the additional models of footwear having full length, tapering, effective length and at least one width measurement that are within an acceptable range of the reference footwear model, and
         displaying, on a display device operably connected to the processing device, the footwear model of the identified one of the additional models of footwear to the user as a recommendation, wherein the footwear model of the identified at least one of the additional models of footwear comprises a visual representation of the identified at least one of the additional models of footwear showing a fit comparison between the reference footwear model and the identified at least one of the additional models of footwear, wherein the fit comparison comprises:
            highlighted areas where the reference footwear model is tighter than the identified at least one of the additional models of footwear,
            highlighted areas where the reference footwear model is looser than the identified at least one of the additional models of footwear, and
            highlighted areas where the reference footwear model and the identified at least one of the additional models of footwear have the same fit.

9. The system of claim 8, further comprising programming instructions for:
   receiving, at the processing device, a user input indicating a comfort rating for at least one of the plurality of data fields;
   in response to the user input, displaying an altered footwear representation for the reference footwear model indicating the comfort ratings for each of the plurality of data fields.

10. The system of claim 9, wherein the altered footwear representation comprises color coded regions indicating the comfort ratings.

11. The system of claim 9, wherein the one or more programming instructions for comparing the footwear representations further comprises one or more programming instructions for evaluating the comfort ratings for each of the plurality of data fields to determine the acceptable range for each of the plurality of data fields.

12. The system of claim 8, wherein the tapering is a full width measurement as a percentage of full length of a footwear model being measured.

13. The system of claim 8, wherein the effective length is an altered full length based upon any slope of a heel cushion in a footwear model being measured.

14. The system of claim 8, wherein each footwear representation is a three dimensional representation.

15. A method of displaying apparel information comprising:
   maintaining a database on a computer readable medium, the database including a plurality of apparel representations wherein each apparel representation comprises data for a plurality of measurement parameters;
   receiving, at a processing device in communication with the computer readable medium, a user selection of a reference apparel model;
   retrieving, by the processing device, an apparel representation of the reference apparel model from the database;
   retrieving, by the processing device, apparel representations for a plurality of additional models of apparel from the database;
   comparing, by the processing device, the apparel representation for the reference apparel model and the apparel representations for the additional models of apparel to identify at least one of the additional models of apparel having measurement parameters that are within an acceptable range of the reference apparel model; and
   displaying, on a display device operably connected to the processing device, the apparel model of the identified one of the additional models of apparel to the user as a recommendation, wherein the apparel model of the identified at least one of the additional models of apparel comprises a visual representation of the identified at least one of the additional models of apparel showing a fit comparison between the reference apparel model and the identified at least one of the additional models of apparel, wherein the fit comparison comprises:
      highlighted areas where the reference apparel model is tighter than the identified at least one of the additional models of apparel,
      highlighted areas where the reference apparel model is looser than the identified at least one of the additional models of apparel, and
      highlighted areas where the reference apparel model and the identified at least one of the additional models of apparel have the same fit.

16. The method of claim 15, further comprising:
   receiving, at the processing device, a user input indicating a comfort rating for at least one of the plurality of measurement parameters;

in response to the user input, displaying an altered apparel representation for the reference apparel model indicating the comfort ratings for each of the plurality of measurement parameters.

17. The method of claim 16, wherein the altered apparel representation comprises color coded regions indicating the comfort ratings.

18. The method of claim 16, wherein the comparing the apparel representations further comprises evaluating the comfort ratings for each of the plurality of measurement parameters to determine the acceptable range for each of the plurality of measurement parameters.

\* \* \* \* \*